(12) United States Patent
Castillo et al.

(10) Patent No.: US 11,787,249 B2
(45) Date of Patent: Oct. 17, 2023

(54) TRAILER HITCH

(71) Applicant: GM GLOBAL TECHNOLOGY OPERATIONS LLC, Detroit, MI (US)

(72) Inventors: Brian V. Castillo, Birmingham, MI (US); Sheryl K. Wolf, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 17/687,824

(22) Filed: Mar. 7, 2022

(65) Prior Publication Data

US 2023/0278381 A1    Sep. 7, 2023

(51) Int. Cl.
| | |
|---|---|
| B60D 1/52 | (2006.01) |
| B60D 1/62 | (2006.01) |
| B60D 1/06 | (2006.01) |
| B60D 1/145 | (2006.01) |

(52) U.S. Cl.
CPC ............... *B60D 1/52* (2013.01); *B60D 1/06* (2013.01); *B60D 1/145* (2013.01); *B60D 1/62* (2013.01)

(58) Field of Classification Search
CPC ..................................................... B60D 1/52
See application file for complete search history.

(56) References Cited

U.S. PATENT DOCUMENTS 11,161,555 B2 * 11/2021 Banks, Jr. .......... B62D 33/0273

* cited by examiner

*Primary Examiner* — Kevin Hurley
(74) *Attorney, Agent, or Firm* — CANTOR COLBURN LLP

(57) ABSTRACT

A receiver hitch for a tow vehicle comprises a tubular receiver located centrally of the receiver hitch having a receiver opening facing outwardly of the tow vehicle. Hitch pin openings are located in opposing side-walls of the tubular receiver having a common axis and configured to receive a hitch pin. A detection device, for detection of the hitch pin, is located about an outer portion of the tubular receiver and includes hitch pin openings that are located in opposing side-walls and have the common axis of the hitch pin openings in the tubular receiver. Electrical contacts at the hitch pin openings in the detection device are in communication with an electrical circuit of the tow vehicle. The hitch pin operates to close the electrical circuit upon insertion into the openings in the detection device and the tubular receiver and contact with the electrical contacts.

18 Claims, 5 Drawing Sheets

TRAILER HITCH

INTRODUCTION

The subject disclosure relates to towing hitches for pulling a trailer behind a towing vehicle and, more particularly, to an apparatus for detecting the presence of a hitch pin in a receiver tube of a towing hitch.

Towing hitches are commonly installed on vehicles and are used for towing trailers as well as for supporting numerous accessories such as bicycle racks and storage systems. A commonly utilized trailer hitch design is a receiver trailer hitch (receiver hitch) that utilizes a receiver tube configured to receive, and support, a tow bar and/or mounting bars of the items just described. When installed in the receiver tube, a locking or hitch pin is passed through openings in the receiver tube and the tow bar in order to lock the tow bar in place. It is desirable to provide a simple and reliable apparatus and system for determining the presence of the hitch pin in the towing hitch.

SUMMARY

In one exemplary embodiment, a receiver hitch for a tow vehicle comprises a tubular receiver located centrally of the receiver hitch and having a receiver opening facing outwardly of the tow vehicle. Hitch pin openings are located in opposing side-walls of the tubular receiver, having a common axis, and configured to receive a hitch pin therein. A detection device, for detection of the hitch pin, is located about an outer portion of the tubular receiver and includes hitch pin openings in opposing side-walls, having the common axis of the hitch pin openings in the tubular receiver. Electrical contacts at the hitch pin openings in the detection device are in communication with an electrical circuit of the tow vehicle. A hitch pin is operable to close the electrical circuit upon insertion into the openings in the detection device and the tubular receiver and contact with the electrical contacts, wherein the electrical circuit operates upon closure by the hitch pin to inform of the presence and absence of the hitch pin in the receiver hitch.

In addition to one or more of the features described herein, the detection device is constructed as a sleeve member that is tubularly configured for location about the outer portion or the tubular receiver.

In addition to one or more of the features described herein, the sleeve member has an electrical conductor embedded therein, such that it is mechanically and electrically isolated from the tubular receiver when installed thereon.

In addition to one or more of the features described herein, the sleeve member is constructed using a polymer injection process to over-mold the electrical conductor therein.

In addition to one or more of the features described herein, the electrical conductor includes the electrical contacts and an electrical connector in communication with the electrical contacts.

In addition to one or more of the features described herein, the electrical connector interfaces with a mating connector of the electrical circuit of the tow vehicle.

In addition to one or more of the features described herein, the electrical circuit communicates with an occupant warning system of the tow vehicle.

In addition to one or more of the features described herein, the receiver hitch further comprises a tubular draw bar adapted for slidable engagement into the tubular receiver through the receiver opening. The tubular draw bar comprises a tow bar riser that terminates at a hitch ball support. A central aperture extends through the hitch ball support that receives a hitch ball and locking nut therein. Hitch pin openings in opposing side-walls of the tubular draw bar have a common axis and are positioned to accept the hitch pin therein. When assembled into the tubular receiver, the tubular draw bar is axially adjusted until the axis of the hitch pin openings in the draw bar align with the axis of the hitch pin openings in the receiver tube to facilitate the insertion of the hitch pin through the draw bar, the detection device, and the tubular receiver to lock the tubular draw bar into engagement with the tubular receiver of the receiver hitch and to close the electrical circuit upon insertion into the openings in the detection device, the tubular draw bar, and the tubular receiver via contact with the electrical contacts.

In another exemplary embodiment a detection device for detection of a hitch pin in a tubular receiver of a receiver hitch comprises a sleeve member that is configured for engagement about an outer portion of the tubular receiver and including hitch pin openings that are located in opposing side-walls of the sleeve member and having a common axis. An electrical conductor is embedded in the sleeve member and is mechanically and electrically isolated from the tubular receiver when installed thereon. Electrical contacts located at the hitch pin openings are in communication with the electrical conductor and an electrical connector is in communication with the electrical contacts via the electrical conductor, wherein insertion of a hitch pin into the hitch pin openings closes a circuit defined by the electrical conductor.

In addition to one or more of the features described herein the sleeve member is constructed using a polymer injection process to over-mold the electrical conductor therein.

In yet another exemplary embodiment a tow vehicle comprises a receiver hitch, mounted to the tow vehicle, comprising a tubular receiver located centrally of the receiver hitch, a receiver opening in the tubular receiver, facing outwardly of the tow vehicle, and hitch pin openings located in opposing side-walls of the tubular receiver having a common axis and configured to receive a hitch pin therein. A detection device, for detection of the hitch pin, is located about an outer portion of the tubular receiver and includes hitch pin openings in opposing side-walls having the common axis of the hitch pin openings in the tubular receiver. Electrical contacts, at the hitch pin openings in the detection device, are in communication with an electrical circuit of the tow vehicle. A hitch pin is operable to close the electrical circuit upon insertion into the openings in the detection device and the tubular receiver and contact with the electrical contacts, wherein the electrical circuit is operable, upon closure by the hitch pin, to inform of the presence and absence of the hitch pin in the receiver hitch.

In addition to one or more of the features described herein, the detection device is constructed as a sleeve member that is tubularly configured for location about the outer portion of the tubular receiver.

In addition to one or more of the features described herein, the sleeve member has an electrical conductor embedded therein such that it is mechanically and electrically isolated from the tubular receiver when installed thereon.

In addition to one or more of the features described herein, the sleeve member is constructed using a polymer injection process to over-mold the electrical conductor therein.

In addition to one or more of the features described herein the electrical conductor includes the electrical contacts and an electrical connector in communication with the electrical contacts.

In addition to one or more of the features described herein, the electrical connector interfaces with a mating connector of the electrical circuit of the tow vehicle.

In addition to one or more of the features described herein, the electrical circuit communicates with an occupant warning system of the tow vehicle.

In addition to one or more of the features described herein the tow vehicle further comprises a tubular draw bar adapted for slidable engagement into the tubular receiver through the receiver opening. The tubular draw bar comprises a tow bar riser that terminates at a hitch ball support. A central aperture extends through the hitch ball support and receives a hitch ball and locking nut therein. Hitch pin openings in opposing side-walls of the tubular draw bar have a common axis and are positioned to accept the hitch pin therein. When assembled into the tubular receiver, the tubular draw bar is axially adjusted until the axis of hitch pin openings in the draw bar align with the axis of the hitch pin openings in the receiver tube to facilitate the insertion of the hitch pin through the draw bar, the detection device and the tubular receiver to lock the tubular draw bar into engagement with the tubular receiver of the receiver hitch and to close the electrical circuit upon insertion into the openings in the detection device, the tubular draw bar and the tubular receiver via contact with the electrical contacts.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
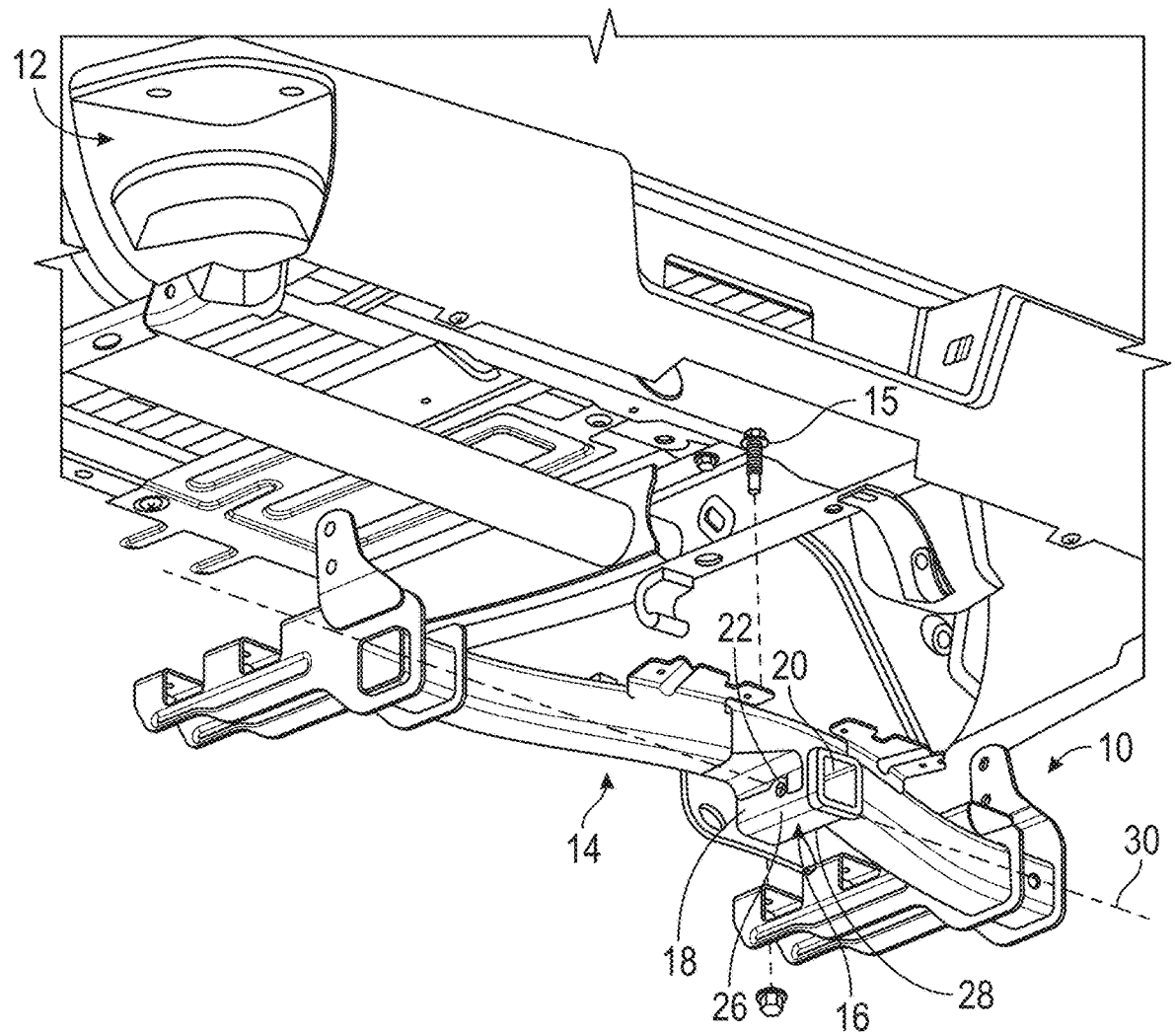
FIG. 1 is a partial, perspective, rear view of a towing vehicle showing the location of installation of a towing hitch.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), and electronic circuit, a processor (shared, dedicated, or group) and memory that executes one or more software and/or firmware programs, a combinational logic circuit, and/or other suitable components that provide the described functionality.

Figure 2:
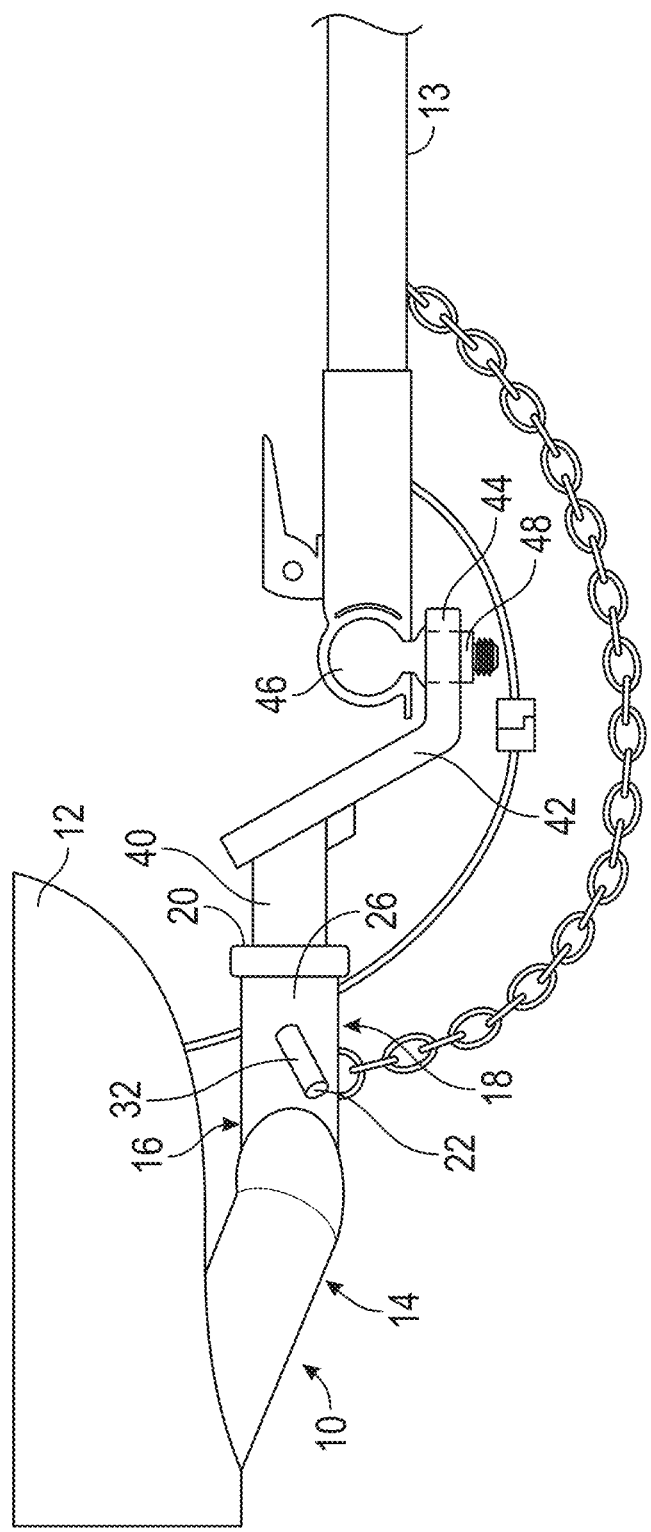
FIG. 2 is a schematic view of a vehicle and trailer coupled using a towing hitch of the disclosure.

Referring to FIGS. 1 and 2, a tow hitch 10 is illustrated relative to a tow vehicle 12. Tow hitches may be installed as a factory feature or as an aftermarket accessory and, as discussed, may be used to tow a trailer 13 or for the mounting of various accessories on the tow vehicle. A commonly used tow hitch 10 is a receiver hitch 14 which may be connected to a structure of tow vehicle 12 via welding or fasteners 15. The receiver hitch 14 has a tubular receiver (receiver) 16 located centrally of the receiver hitch 14. In the embodiment illustrated, the receiver 16 is an axially extending square or rectangular tube 18 (other cross sections are envisioned) having a receiver opening 20 facing in a direction of the trailer 13. Hitch pin openings 22 are located in opposing side-walls 26 and 28. The hitch pin openings 22 share a common axis 30 and are positioned to accept a hitch pin 32 therein. When inserted into hitch pin openings 22, the hitch pin 32 extends laterally through the tubular receiver 16.

As illustrated in FIG. 2, a tubular draw bar 40 is adapted for slidable engagement into the tubular receiver 16 through receiver opening 20. The tubular draw bar 40 may include a tow bar riser 42 that terminates at a generally horizontal hitch ball support 44. The hitch ball support 44 has a central aperture (not separately labelled) extending therethrough which receives a hitch ball 46 that is secured by a locking nut 48. In other applications, the tubular draw bar 40 may be a support for an accessory such as a bicycle rack or storage rack (not shown). The tubular draw bar 40 includes a pair of hitch pin openings (not shown) that are located in opposing side-walls of the draw bar. The hitch pin openings share a common axis and are positioned to accept the hitch pin 32 therein. When inserted into the hitch pin openings, the hitch pin 32 extends laterally through the tubular draw bar 40.

The hitch pin 32, the hitch pin openings 22 in tubular receiver 16, and the associated hitch pin openings in tubular draw bar 40 are safety features of the receiver hitch 14. When assembled into the axially extending tube 18 of the tubular receiver 16, the tubular draw bar 40 is axially adjusted until the axis of hitch pin openings of the tubular draw bar 40 align with the common axis 30 of the hitch pin openings 22 in the receiver tube 18. The alignment of the hitch pin openings facilitates the insertion of the hitch pin 32 into hitch pin openings of the receiver tube 18 and the draw bar 40 simultaneously to thereby lock the tubular draw bar 40 into engagement with the tubular receiver 16 of the receiver hitch 14. Secure attachment of the trailer 13 to the tow vehicle 12 is now assured.

Figure 3:
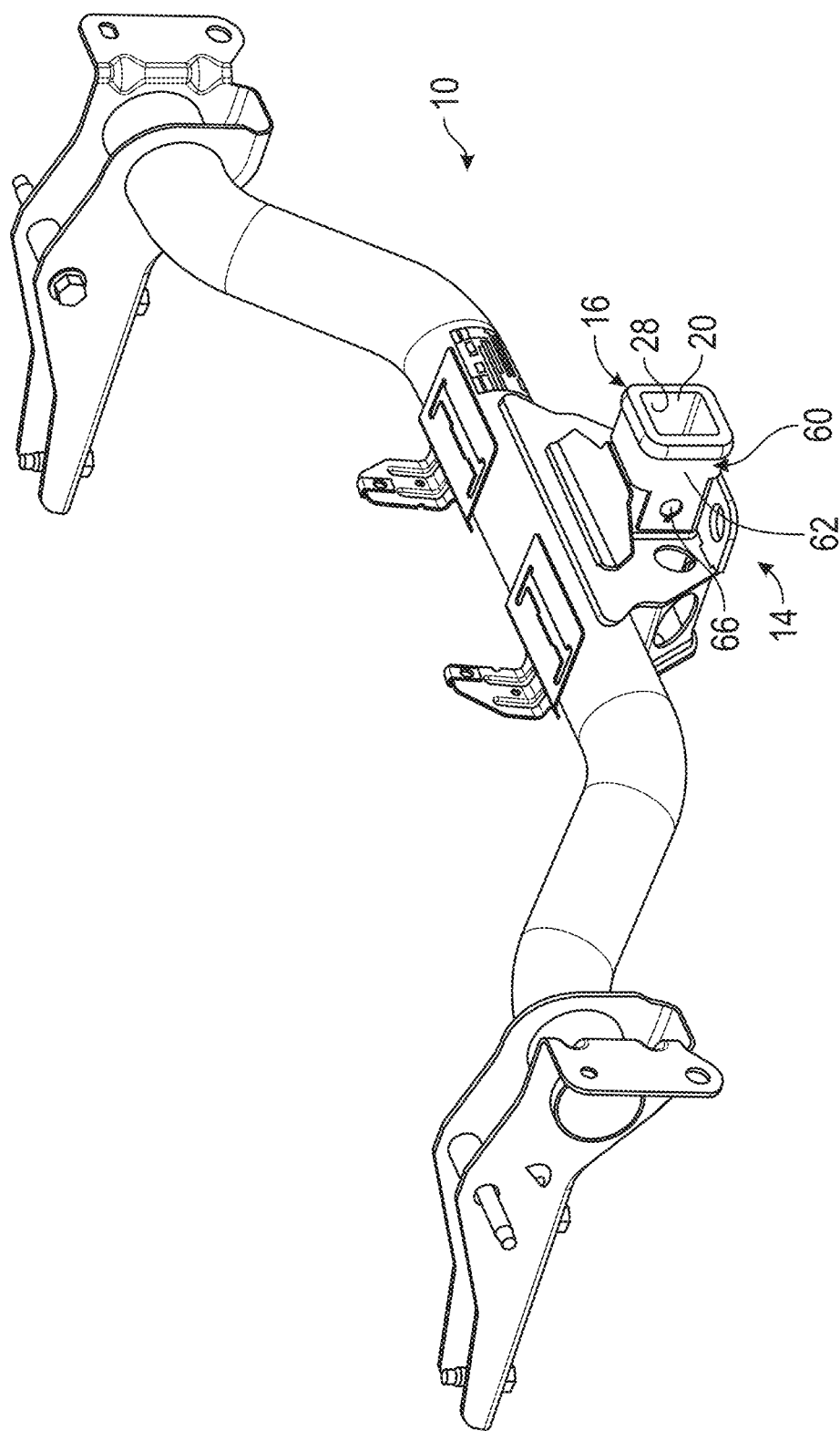
FIG. 3 is a perspective view of a towing hitch embodying features of the disclosure.
Figure 4:
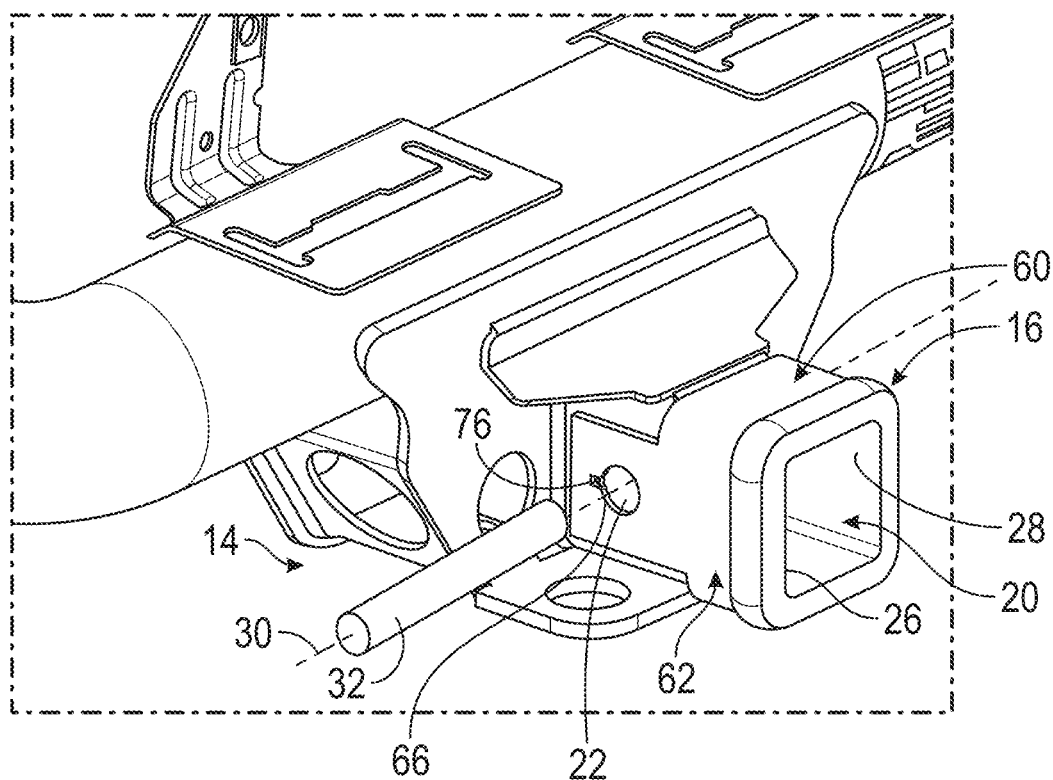
FIG. 4 is a perspective view of a receiver tube, of the towing hitch of FIG. 3, embodying features of the disclosure.
Figure 5:
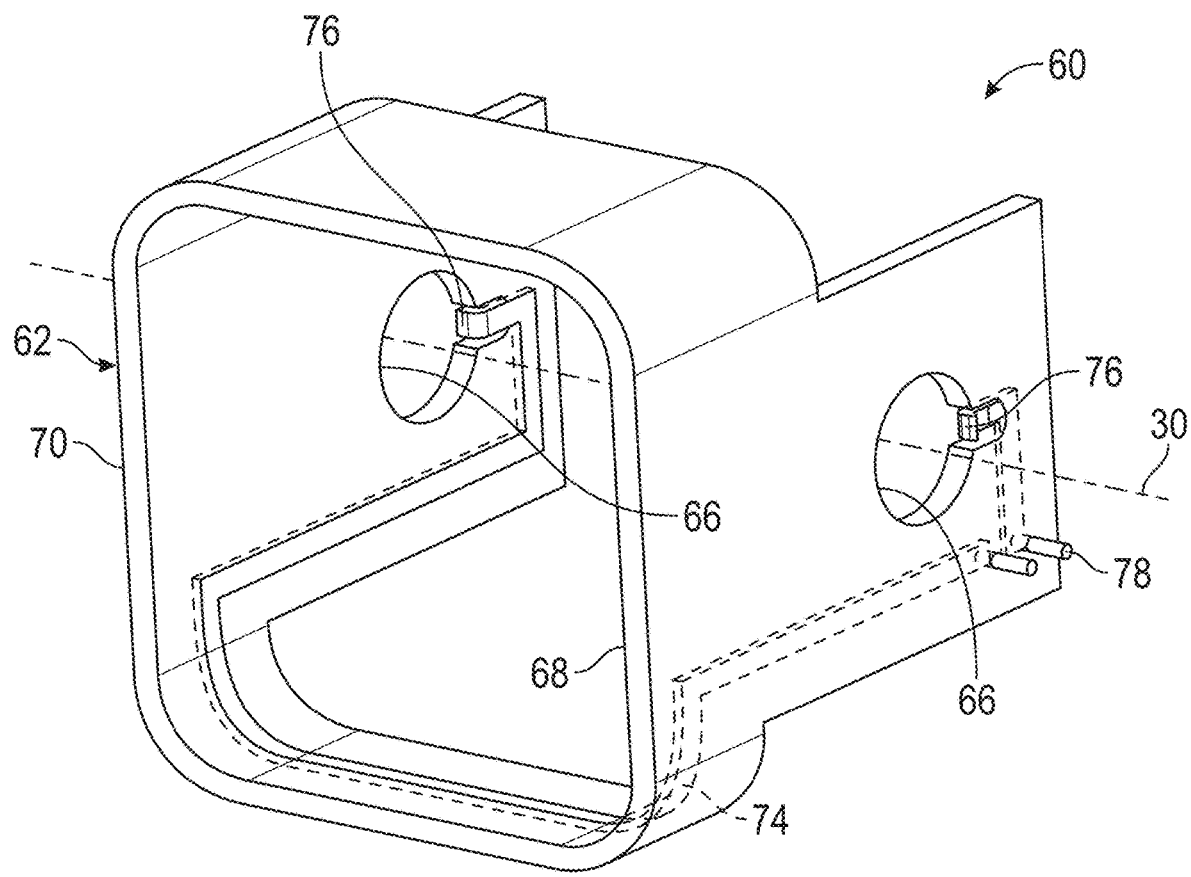
FIG. 5 is a translucent perspective view of a hitch pin sensor embodying features of the disclosure.

Referring now to FIGS. 3, 4 and 5 with continuing reference to FIGS. 1 and 2, a detection device 60 for detection of the hitch pin 32 is disclosed. The detection device 60 is constructed as a sleeve member 62 that is tubularly configured for engagement about an outer portion of the tubular receiver 16. The sleeve member 62 includes a pair of hitch pin openings 66 that are located in opposing side-walls 68 and 70. The hitch pin openings 66 share the common axis 30 of the tubular receiver 16 and are positioned to accept the hitch pin 32 therein.

Figure 6:
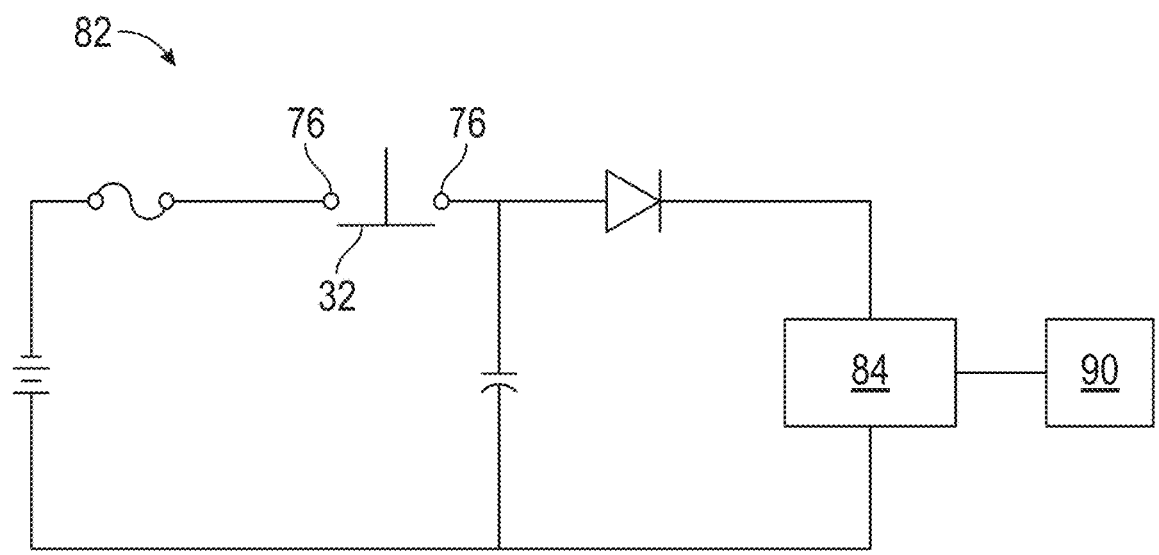
FIG. 6 is a schematic of a circuit diagram embodying features of the present disclosure.

In an embodiment, the sleeve member 62 is constructed of a non-conductive polymer material in an injection molding process, for example. Other non-conductive materials and methods of manufacture are envisioned. The molding process used to construct the sleeve member 62 includes an over-molding step in which an electrical conductor 74 is embedded within the polymer injected molded piece such that it is mechanically and electrically isolated from the structure of the tubular receiver 16. As illustrated in FIG. 5, the electrical conductor 74 has electrical contacts 76 protruding from the sleeve member 62 at both of the hitch pin openings 66. When inserted into the hitch pin openings 66, the hitch pin 32 will contact the electrical contacts 76 of the electrical conductor 74. The electrical conductor 74 also includes an electrical connector 78 in communication with the electrical contacts 76. The electrical connector 78 may interface with a mating connector (not shown) of an electrical circuit 82, FIG. 6. The electrical circuit 82 is, in an embodiment, in communication with a warning system 84 of the tow vehicle 12 that operates to inform of the presence (or absence) of the hitch pin 32 in the receiver hitch 14; including when a tow bar or other accessory is present. As illustrated in FIG. 6, the absence of the hitch pin 32 results in an open electrical circuit 82 and an informational message may be displayed, via a driver interface 90, to the operator for example. On the other hand, insertion of the hitch pin 32 into the aligned hitch pin openings 22, 66 contacts the electrical contacts 76 of the electrical conductor 74 to thereby close the electrical circuit 82 and inform, via the driver interface, for example, that the hitch pin 32 is in place. In an exemplary embodiment, the presence of the hitch pin may cause the electrical circuit 82 to disable certain functions of the tow vehicle 10, such as the opening of a vehicle tailgate, for instance.

Using the standard hitch pin 32 to close electrical circuit 82 associated with occupant warning system 84 can be used for functions including a) notifying the operator of the presence and/or absence of the hitch pin 32 as a safety precaution, b) preventing damage to a tailgate by disabling opening of the gate when a draw bar is present in the receiver, and c) enabling a towing mode of the tow vehicle that is contingent on the presence of an installed draw bar, for example.

While the above disclosure has been described with reference to exemplary embodiments, if will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A receiver hitch for a tow vehicle comprising:
a tubular receiver located centrally of the receiver hitch;
a receiver opening, in the tubular receiver, facing outwardly of the tow vehicle;
hitch pin openings located in opposing side-walls of the tubular receiver having a common axis and configured to receive a hitch pin therein;
a detection device, for detection of the hitch pin, located about an outer portion of the tubular receiver and including hitch pin openings in opposing side-walls and having the common axis of the hitch pin openings in the tubular receiver; and
electrical contacts at the hitch pin openings in the detection device in communication with an electrical circuit of the tow vehicle, the hitch pin operable to close the electrical circuit upon insertion into the hitch pin openings in the detection device and the tubular receiver and contact with the electrical contacts, and wherein the electrical circuit operates upon closure by the hitch pin to inform of a presence and an absence of the hitch pin in the receiver hitch.

2. The receiver hitch of claim 1, wherein the detection device is constructed as a sleeve member that is tubularly configured for location about the outer portion of the tubular receiver.

3. The receiver hitch of claim 2, wherein the sleeve member has an electrical conductor embedded therein such that it is mechanically and electrically isolated from the tubular receiver when installed thereon.

4. The receiver hitch of claim 3, wherein the sleeve member is constructed using a polymer injection process to over-mold the electrical conductor therein.

5. The receiver hitch of claim 3, wherein the electrical conductor includes the electrical contacts and an electrical connector in communication with the electrical contacts.

6. The receiver hitch of claim 5, wherein the electrical connector interfaces with a mating connector of the electrical circuit of the tow vehicle.

7. The receiver hitch of claim 1, wherein the electrical circuit communicates with an occupant warning system of the tow vehicle.

8. The receiver hitch of claim 1, further comprising:
a tubular draw bar adapted for slidable engagement into the tubular receiver through the receiver opening, the tubular draw bar comprising:
a tow bar riser that terminates at a hitch ball support;
a central aperture extending through the hitch ball support that receives a hitch ball and locking nut therein; and
hitch pin openings in opposing side-walls of the tubular draw bar, the hitch pin openings having a common axis and positioned to accept the hitch pin therein, wherein, when assembled into the tubular receiver, the tubular draw bar is axially adjusted until the common axis of hitch pin openings in the tubular draw bar align with the common axis of the hitch pin openings in the tubular receiver to facilitate the insertion of the hitch pin through the tubular draw bar, the detection device and the tubular receiver to lock the tubular draw bar into engagement with the tubular receiver of the receiver hitch and to close the electrical circuit upon insertion into the openings in the detection device, the tubular draw bar and the tubular receiver via contact with the electrical contacts.

9. A detection device for detection of a hitch pin in a tubular receiver of a receiver hitch, comprising:
a sleeve member that is configured for engagement about an outer portion of the tubular receiver including hitch pin openings that are located in opposing side-walls of the sleeve member and have a common axis;
an electrical conductor embedded in the sleeve member that is mechanically and electrically isolated from the tubular receiver when installed thereon;
electrical contacts at the hitch pin openings in communication with the electrical conductor, and
an electrical connector in communication with the electrical contacts via the electrical conductor wherein insertion of the hitch pin into the hitch pin openings closes a circuit defined by the electrical conductor.

10. The detection device of claim 9, wherein the sleeve member is constructed using a polymer injection process to over-mold the electrical conductor therein.

11. A tow vehicle comprising:
a receiver hitch mounted to the tow vehicle comprising:
a tubular receiver located centrally of the receiver hitch;
a receiver opening, in the tubular receiver, facing outwardly of the tow vehicle;

hitch pin openings located in opposing side-walls of the tubular receiver and having a common axis and configured to receive a hitch pin therein;

a detection device, for detection of the hitch pin, located about an outer portion of the tubular receiver and including hitch pin openings in opposing side-walls having the common axis of the hitch pin openings in the tubular receiver; and electrical contacts at the hitch pin openings in the detection device in communication with an electrical circuit of the tow vehicle, a hitch pin operable to close the electrical circuit upon insertion into the openings in the detection device and the tubular receiver and contact with the electrical contacts, wherein the electrical circuit is operable, upon closure by the hitch pin, to inform of a presence and an absence of the hitch pin in the receiver hitch.

12. The tow vehicle of claim 11, wherein the detection device is constructed as a sleeve member that is tubularly configured for location about the outer portion of the tubular receiver.

13. The tow vehicle of claim 12, wherein the sleeve member has an electrical conductor embedded therein such that it is mechanically and electrically isolated from the tubular receiver when installed thereon.

14. The tow vehicle of claim 13, wherein the sleeve member is constructed using a polymer injection process to over-mold the electrical conductor therein.

15. The tow vehicle of claim 13, wherein the electrical conductor includes the electrical contacts and an electrical connector in communication with the electrical contacts.

16. The tow vehicle of claim 15, wherein the electrical connector interfaces with a mating connector of the electrical circuit of the tow vehicle.

17. The tow vehicle of claim 11, wherein the electrical circuit communicates with an occupant warning system of the tow vehicle.

18. The tow vehicle of claim 1, further comprising:

a tubular draw bar adapted for slidable engagement into the tubular receiver through the receiver opening, the tubular draw bar comprising:

a tow bar riser that terminates at a hitch ball support;

a central aperture extending through the hitch ball support that receives a hitch ball and locking nut therein; and hitch pin openings in opposing side-walls of the tubular draw bar, the hitch pin openings having a common axis and positioned to accept the hitch pin therein, wherein, when assembled into the tubular receiver, the tubular draw bar is axially adjusted until the common axis of hitch pin openings in the draw bar align with the common axis of the hitch pin openings in the receiver tube to facilitate the insertion of the hitch pin through the tubular draw bar, the detection device and the tubular receiver to lock the tubular draw bar into engagement with the tubular receiver of the receiver hitch and to close the electrical circuit upon insertion into the hitch pin openings in the detection device, the tubular draw bar and the tubular receiver via contact with the electrical contacts.

* * * * *